(12) United States Patent
Rouvinen

(10) Patent No.: US 9,942,387 B2
(45) Date of Patent: Apr. 10, 2018

(54) METHOD AND APPARATUS FOR SENSING FLEXING OF A DEVICE

(71) Applicant: NOKIA CORPORATION, Espoo (FI)

(72) Inventor: Jarkko Rouvinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 288 days.

(21) Appl. No.: 14/655,602

(22) PCT Filed: Jan. 4, 2013

(86) PCT No.: PCT/FI2013/050004
§ 371 (c)(1),
(2) Date: Jun. 25, 2015

(87) PCT Pub. No.: WO2014/106680
PCT Pub. Date: Jul. 10, 2014

(65) Prior Publication Data
US 2015/0334224 A1    Nov. 19, 2015

(51) Int. Cl.
*G06F 3/0346* (2013.01)
*H04M 1/725* (2006.01)
(Continued)

(52) U.S. Cl.
CPC ...... *H04M 1/72583* (2013.01); *G06F 1/1652* (2013.01); *G06F 3/0346* (2013.01);
(Continued)

(58) Field of Classification Search
CPC ........... H04M 1/72583; H04M 1/0268; H04M 1/72519; H04M 2250/12; H04M 2250/52;
(Continued)

(56) References Cited

U.S. PATENT DOCUMENTS

| 6,243,075 B1 | 6/2001 | Fishkin et al. |
| 2004/0008191 A1* | 1/2004 | Poupyrev ............... G06F 3/011 345/184 |

(Continued)

FOREIGN PATENT DOCUMENTS

| EP | 2065783 | 6/2009 |
| EP | 2280331 | 2/2011 |

(Continued)

OTHER PUBLICATIONS

Extended European Search Report for European Patent Application No. 13869943.4, dated Sep. 30, 2016, 8 pages.

(Continued)

*Primary Examiner* — Premal R Patel
(74) *Attorney, Agent, or Firm* — Locke Lord LLP

(57) ABSTRACT

A method, apparatus and computer program for receiving first orientation signals indicative of orientation of a first portion of a body of an apparatus, which body is capable of being flexed during use of the apparatus at least by any of: bending; and twisting; the body having the first portion and a second portion that move with respect to each other when the body is being flexed; receiving second orientation signals indicative of orientation of the second portion of a body of an apparatus; and determining motion of at least one of the first portion and second portion based on the first orientation signals and the second orientation signals.

15 Claims, 5 Drawing Sheets

Center of curvature

(51) Int. Cl.
*H04M 1/02* (2006.01)
*G06F 1/16* (2006.01)
*H04N 5/225* (2006.01)
*H04N 5/232* (2006.01)

(52) U.S. Cl.
CPC ..... *H04M 1/0268* (2013.01); *H04M 1/72519* (2013.01); *H04N 5/2258* (2013.01); *H04N 5/232* (2013.01); *G06F 2203/04102* (2013.01); *H04M 2250/12* (2013.01); *H04M 2250/52* (2013.01)

(58) Field of Classification Search
CPC ................ G06F 1/1652; G06F 3/0346; G06F 2203/04102; H04N 5/232; H04N 5/2258
See application file for complete search history.

(56) References Cited

U.S. PATENT DOCUMENTS

| | | | |
|---|---|---|---|
| 2006/0044268 A1 | 3/2006 | Robin et al. | |
| 2007/0296820 A1* | 12/2007 | Lonn | G06K 9/00248 348/207.99 |
| 2008/0303782 A1* | 12/2008 | Grant | G06F 1/1615 345/156 |
| 2010/0011291 A1* | 1/2010 | Nurmi | G06F 3/0414 715/702 |
| 2010/0164888 A1 | 7/2010 | Okumura et al. | |
| 2012/0001722 A1 | 1/2012 | Jaiswal et al. | |
| 2012/0092363 A1 | 4/2012 | Kim et al. | |
| 2012/0194448 A1* | 8/2012 | Rothkopf | A45C 13/002 345/173 |
| 2012/0235893 A1* | 9/2012 | Phillips | G06F 3/012 345/156 |
| 2012/0268622 A1 | 10/2012 | Hildreth | |
| 2013/0044215 A1* | 2/2013 | Rothkopf | G06F 1/163 348/143 |
| 2013/0050499 A1* | 2/2013 | Siklossy | G06T 7/0042 348/169 |
| 2013/0093660 A1* | 4/2013 | Hirsch | G06F 1/1694 345/156 |
| 2013/0234926 A1* | 9/2013 | Rauber | G06F 3/0487 345/156 |
| 2013/0285921 A1* | 10/2013 | Alberth, Jr. | G06F 1/1652 345/173 |
| 2014/0043516 A1* | 2/2014 | Baker | G03B 21/14 348/333.1 |

FOREIGN PATENT DOCUMENTS

| | | |
|---|---|---|
| EP | 2315186 | 4/2011 |
| JP | 2008-181466 | 8/2008 |
| JP | 2012-502369 | 1/2012 |
| WO | WO2010/028394 | 3/2010 |

OTHER PUBLICATIONS

English Language Abstract of Japanese Patent Application Publication No. JP2008-181466, 1 page.
English Language Machine Translation of Japanese Patent Application Publication No. JP2008-181466, 28 pages.
International Search Report for International Application No. PCT/FI2013/050004—Date of Completion of Search: Sep. 17, 2013, 5 pages.
Written Opinion of the International Searching Authority for International Application No. PCT/FI2013/050004—Date of Completion of Opinion: Sep. 16, 2013, 7 pages.

* cited by examiner

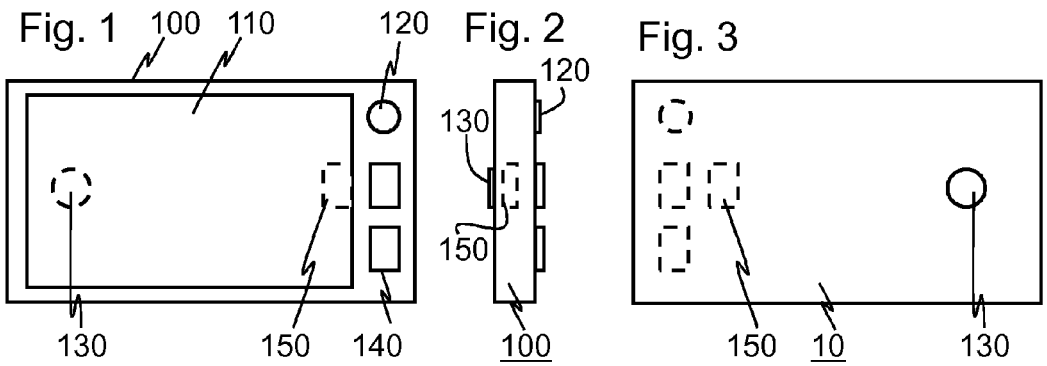
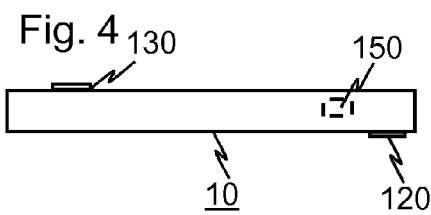
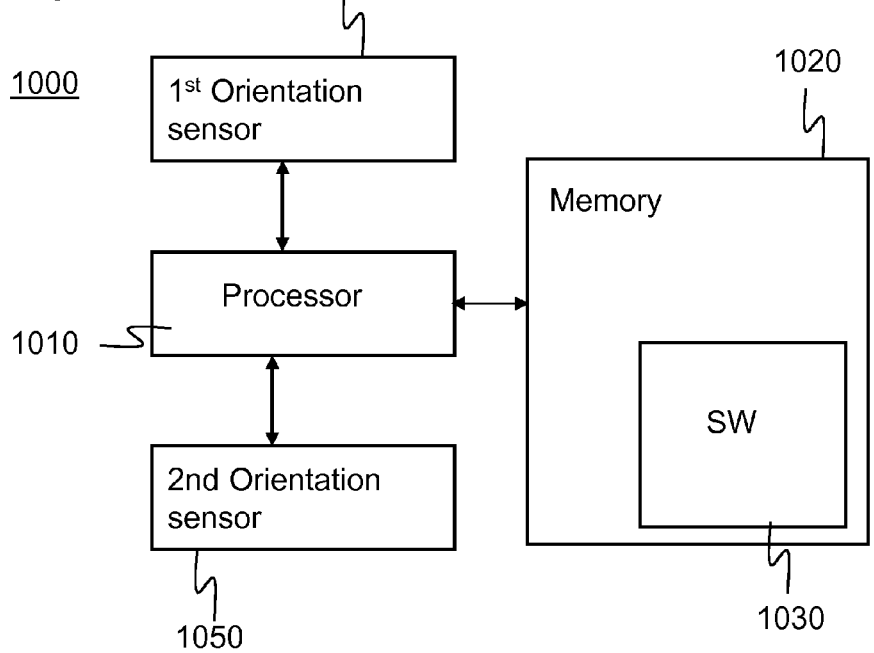

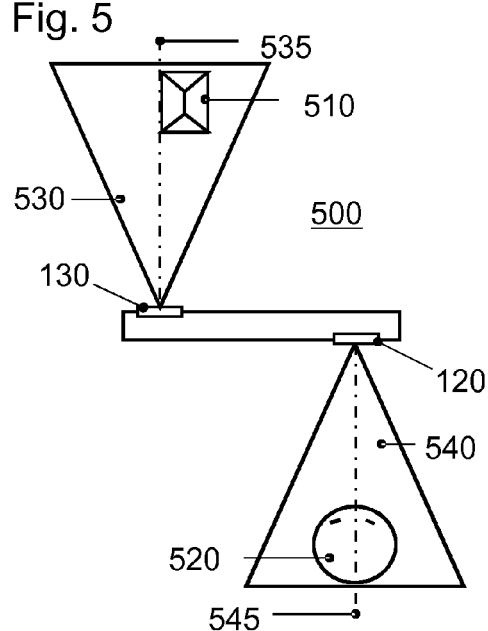
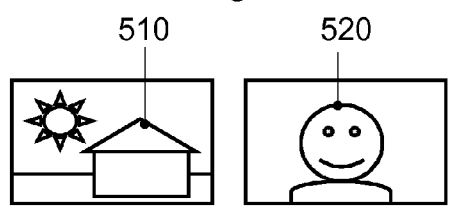
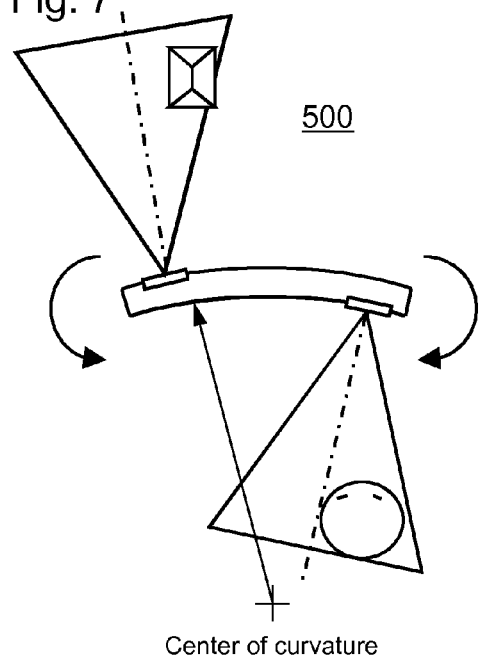
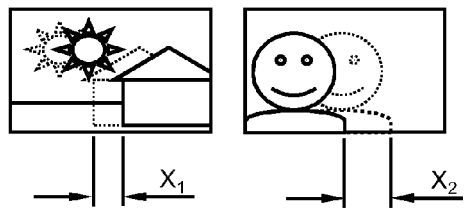
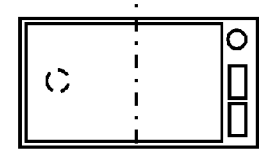

Center axis of curvature

METHOD AND APPARATUS FOR SENSING FLEXING OF A DEVICE

TECHNICAL FIELD

The present application generally relates to sensing flexing of a device.

BACKGROUND

Modern devices such as mobile telephones and tablet computers have developed with extremely fast pace during last decades. First GSM phone calls were made only about 20 years ago. Since then, mobile phones have become miniaturized computers, often equipped with touch screens, compasses, satellite navigation, multi-band radios, cameras, gyroscopes for automatic display orientation changing or muting ringer sound on incoming call by turning the display down, modems capable of megabits a second data rates and even flash lights that double as torches.

Various improvements have also been made in the usability of devices. First devices of various types, such as cameras and mobile telephones, had dedicated buttons for each function. Since then, displays capable of presenting menus and menu selection keys reduced the number of buttons and/or availed the user of more functions. More recently, touch screens have shifted the user interfaces further from hierarchical menu trees towards a flat structure in which one or more pages host large number of icons representing different functions, services or applications.

One new development that has been demonstrated with prototype mobile phones is flexible devices that users can use e.g. for entering user input. The flexible devices have become possible to construct in result of a number of different technical advances, such as development of flexible display screens. There are yet number of challenges that have made mass production and/or reliability of the flexible devices impractical. New techniques are needed for addressing these problems or at least for providing new technical alternatives.

SUMMARY

Various aspects of examples of the invention are set out in the claims.

According to a first example aspect of the present invention there is provided an apparatus, comprising:
 a body configured to be capable of being flexed during use of the apparatus at least by any of: bending; and twisting;
 the body comprising a first portion and a second portion that move with respect to each other when the body is being flexed;
 the first portion comprising a first orientation sensor configured to produce first orientation signals;
 the second portion comprising a second orientation sensor configured to produce second orientation signals;
 the apparatus further comprising at least one processor configured to:
 determine motion of at least one of the first portion and second portion based on the first orientation signals and the second orientation signals.

The body may be flexed by a user.

According to a second example aspect of the present invention there is provided a method, comprising:
 receiving first orientation signals indicative of orientation of a first portion of a body of an apparatus, which body is capable of being flexed during use of the apparatus at least by any of: bending; and twisting; the body comprising the first portion and a second portion that move with respect to each other when the body is being flexed;
 receiving second orientation signals indicative of orientation of the second portion of a body of an apparatus; and
 determining motion of at least one of the first portion and second portion based on the first orientation signals and the second orientation signals.

According to a third example aspect of the present invention there is provided an apparatus, comprising:
 a processor configured to
 receive first orientation signals indicative of orientation of a first portion of a body of an apparatus, which body is capable of being flexed during use of the apparatus at least by any of: bending; and twisting; the body comprising the first portion and a second portion that move with respect to each other when the body is being flexed;
 receive second orientation signals indicative of orientation of the second portion of a body of an apparatus; and
 determine motion of at least one of the first portion and second portion based on the first orientation signals and the second orientation signals.

According to a fourth example aspect of the present invention there is provided an apparatus, comprising:
 at least one processor; and
 at least one memory including computer program code;
 the at least one memory and the computer program code being configured to, with the at least one processor, cause the apparatus to perform at least the following:
 receiving first orientation signals indicative of orientation of a first portion of a body of an apparatus, which body is capable of being flexed during use of the apparatus at least by any of: bending; and twisting; the body comprising the first portion and a second portion that move with respect to each other when the body is being flexed;
 receiving second orientation signals indicative of orientation of the second portion of a body of an apparatus; and
 determining motion of at least one of the first portion and second portion based on the first orientation signals and the second orientation signals.

According to a fifth example aspect of the present invention there is provided a computer program, comprising:
 code for receiving first orientation signals indicative of orientation of a first portion of a body of an apparatus, which body is capable of being flexed during use of the apparatus at least by any of: bending; and twisting; the body comprising the first portion and a second portion that move with respect to each other when the body is being flexed;
 code for receiving second orientation signals indicative of orientation of the second portion of a body of an apparatus; and
 code for determining motion of at least one of the first portion and second portion based on the first orientation signals and the second orientation signals;
 when the computer program is run on a processor.

The computer program may be a computer program product comprising a computer-readable medium bearing computer program code embodied therein for use with a computer.

According to a sixth example aspect of the present invention there is provided an apparatus, comprising:
  body means for being flexed during use of the apparatus at least by any of: bending; and twisting;
  the body means comprising a first portion and a second portion that move with respect to each other when the body is being flexed;
  the first portion comprising first orientation sensing means for producing first orientation signals;
  the second portion comprising second orientation sensing means for producing second orientation signals;
  the apparatus further comprising at least one processing means for:
    determining motion of at least one of the first portion and second portion based on the first orientation signals and the second orientation signals.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows a front view of an apparatus according to an example embodiment of the invention;
FIG. 2 shows a side view of the apparatus of FIG. 1;
FIG. 3 shows a rear view of the apparatus of FIG. 1;
FIG. 4 shows a top view of the apparatus of FIG. 1;
FIG. 5 shows a top view of a system comprising the apparatus of FIG. 1 in a non-flexed configuration;
FIG. 6 shows the views of a rear camera unit of FIG. 1 and of a front camera unit of FIG. 1 as seen by these camera units in the configuration of Fig. 5;
FIG. 7 shows a top view of the system of FIG. 5 wherein the apparatus in a flexed configuration;
FIG. 8 shows the views of a rear camera unit of FIG. 1 and of a front camera unit of FIG. 1 as seen by these camera units in the configuration of FIG. 7;
FIG. 9 shows center axis of curvature illustration for the flexed configuration of FIG. 7;
FIG. 10 shows a simplified block diagram of some details of a device according to an example embodiment of the invention.

DETAILED DESCRIPTION OF THE DRAWINGS

Figure 11:
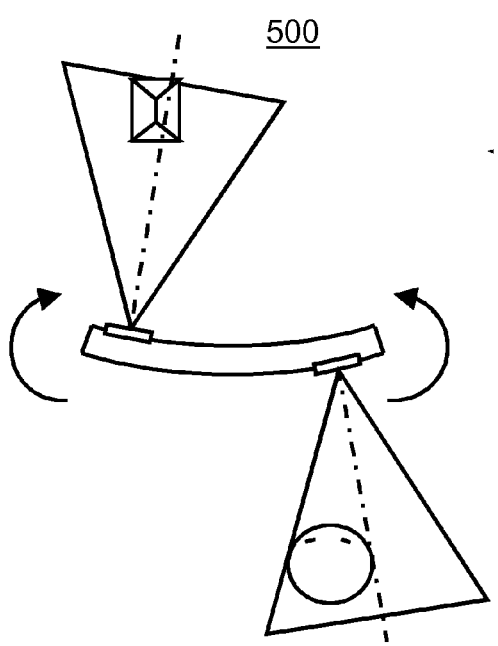
FIG. 11 shows bending the apparatus of FIG. 1 so that the first and second portions are pushed backwards with relation to the central part of the apparatus.

An example embodiment of the present invention and its potential advantages are understood by referring to FIGS. 1 through 21 of the drawings. In this description, like reference signs denote like parts.

FIGS. 1 to 4 show different views of an apparatus 10 according to an example embodiment of the invention. The apparatus 10 comprises a body 100; on its front side, also referred to as operation side, a display 110 with a given display direction to which information is displayed; a front camera 120 unit; a rear camera unit 130 drawn with a dashed line to indicate that the element in question resides underneath the shown surface of the apparatus 100; one or more keys 140; and an orientation sensor 150 that is e.g. a gyroscope or magnetometer.

The apparatus 100 is a so-called mono-block device i.e. the apparatus has a single body 100 to which its different parts are attached. Some larger parts such as the display 110 may also be constituents of the body 100. The term body can be generally understood as a structure that holds together various parts of the apparatus 10, whether inside the apparatus 10 or partly or entirely on a surface of the apparatus 10.

The body 100 is configured to be capable of being flexed during use of the apparatus at least by any of: bending; and twisting. For instance, the body 100 can be made of a flexible material or of mutually turning segments such that electrical connections therein are configured to tolerate flexing of the body 100. As flexible devices are known as such, it is not necessary to describe with further detail the structure of the body. The body 100 can be flexed e.g. by the user of the apparatus 10 and/or by one or more controllable actuators such as piezoelectric or electro-dynamic actuators or an actuator made of muscle material.

Flexible devices such as the apparatus 10 are often not only made flexible for more pleasant feel: instead, the flexing can be used for controlling operation of the apparatus 10. Therefore, the apparatus 10 needs to detect whether and how the apparatus 10, or the body 100 more precisely, is flexed. The inventor has realized that instead of embedding some stretch detectors or other sensors for detecting the flexing, it is possible to detect the orientations of different portions (such as opposite ends) of the apparatus 10 and determine the flexing based on the difference of these detected orientations. The detection of orientation is performed in some example embodiments by using a gyroscope, magnetometer or even a camera based on a change in signals produced by a camera unit. Hence, in this document, term orientation sensor is defined as any sensor that can be used to determine the orientation of the sensor, even though camera units would not normally be considered as orientation sensors.

The camera signals can be understood as any signals produced by a camera unit, such as image information produced by pixel detectors of an image capture unit; and/or select sub-set of the pixel detectors or separate smaller set of pixel detectors e.g. normally used for auto-focus.

For better understanding the use of camera units as orientation sensors, let us next turn to FIGS. 5 to 9.

FIG. 5 shows a top view of a system 500 comprising the apparatus 10 in a non-flexed configuration, a first image object 510 and a second image object 520 (user in this case), with the apparatus 10 drawn with an exaggerated size for illustration purpose. FIG. 5 also shows a first field of view 530 and containing the first image object and a second field of view 540 containing the first image object 520. The first field of view 530 and the second field of view 540 have respective first optical axis 535 and second optical axis 545.

FIG. 6 shows views of the rear camera unit 130 and of the front camera unit 120 as seen by these camera units in the configuration of FIG. 5.

FIG. 7 shows a top view of the system of FIG. 5 wherein the apparatus 10 is in a flexed configuration or bent so that opposite lateral edges of the apparatus 10 have been slightly pulled towards the user e.g. by fingers of the user. FIG. 7 clearly illustrates that the orientation sensors (camera units 130, 120 in FIG. 7) changes and also that their mutual orientation changes when the apparatus 10 is being flexed.

FIG. 8 shows the views of the rear camera unit 130 and of the front camera unit 120 as seen by these camera units in the configuration of FIG. 7 and also dashed representations of the earlier views as shown in FIG. 6. The image objects have shifted horizontally by amounts $X_1$ and $X_2$, wherein X represents some units for angular change such as pixels. It is noteworthy that the distances to the first and second image objects from the apparatus 10 can be very different, but this is redundant for the operation. The camera units 120, 130 only produce camera signals based on which it is possible to determine angular changes and a mutual angular change.

Looking at FIGS. 5 and 7 it can be seen that the front camera unit 120 and the rear camera unit 130 locate at respective first and second portions of the body 100. For determination of the flexing of the apparatus 10, the first and second portions are in an example embodiment at opposite edges of the body 100. Thus the orientation changes experienced by the first and second portions and by associated orientation sensors has larger magnitude than if the first and second portions were next to the center axis of curvature of the device (see FIG. 9). It should yet be understood that the first and second portions need not be at equal distance from the edges or the center axis of curvature of the device and that the locations of the first and second portions can be freely chosen. In some example embodiments, the first and second portions are portions generally nearer to opposite edges between which a geometrical center of the device resides than the center axis of curvature of the device.

FIGS. 1 to 4 also show an orientation sensor 150 inside the body 100 as an example of an orientation sensor that is not optical i.e. needs no optical access to the outside of the apparatus 10. The part that forms an orientation signal for the first portion can generally be referred to as a first orientation sensor and the part that forms an orientation signal for the second portion can generally be referred to as a second orientation sensor.

FIG. 10 shows a simplified block diagram of some details of a device 1000 according to an example embodiment of the invention. The device 1000 comprises a processor 1010 and a memory 1020 comprising software or program code configured to cause the processor 1010 to control operation of the device 1000 according to the software. The device 1000 further comprises two orientation sensors, a first orientation sensor 1040 and a second orientation sensor 1050. These orientation sensors can be, for example, of same or different type, such as gyroscopes, magnetometers or camera units.

It shall be understood that the processor 1000 is drawn merely for illustration purpose as a single discrete component while in the processor 1000 can be implemented as two or more different components and/or integrated with one or more other components. For instance, some commercially existing orientation sensors usable for implementing some example embodiments are integrally formed to comprise a sensing circuitry such as a gyroscope and/or magnetometer as well as a controller or processor configured to readily process signals produced by the sensing circuitry. In one example embodiment, one or more of the orientation sensors is/are equipped with such processing so that the orientation sensor(s) readily produce orientation signals that indicate current orientation at the respective orientation sensor(s). The processor 1010 can then determine mutual orientation of the first portion and the second portion based on the first orientation signals and the second orientation signals. This mutual orientation reflects the current flexing of the device when the orientation signals represent orientations of different portions of the device. On the other hand, the processor 1010 can also be understood broader to comprise analogue-to-digital converter and even some analogue electronics. In such an example embodiment, the processor 1010 receives raw signals from the orientation sensors (or one of them) and determines current orientation from the received raw signals for each orientation sensor from which the raw signals were received.

Armed with the orientations of the orientation sensors the processor 1010 determines the mutual orientation of the first portion and the second portion.

Turning back to FIG. 8, in an example embodiment in which a camera is used as an orientation sensor, the processor 1010 processes the orientation signals received from a camera unit by identifying one or more image objects in signals produced by the camera unit at two different moments of time and by identifying relative movement of the identified one or more image objects.

When the processor has determined the mutual orientation of the first portion and the second portion and thus the type and magnitude of current flexing of the apparatus, the processor uses or signals this information e.g. for use as user input that is given by flexing the device 1000.

Figure 12:
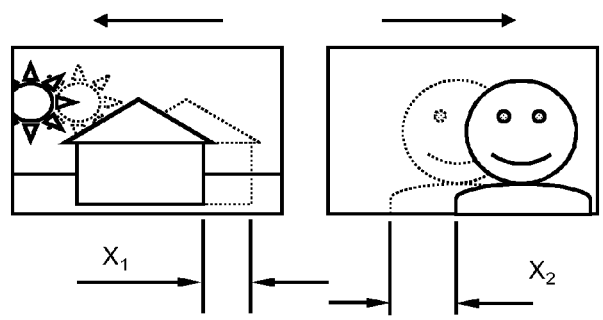
FIG. 12 shows a corresponding change in the views of the two cameras when the apparatus is bent as shown in FIG. 11.
Figure 13:
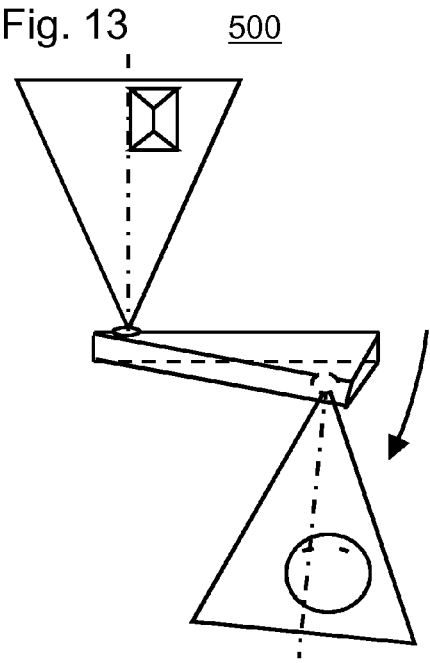
FIG. 13 shows twisting of the apparatus of FIG. 1 so that the first portion is held in place while the second portion is twisted back from upper edge.
Figure 14:
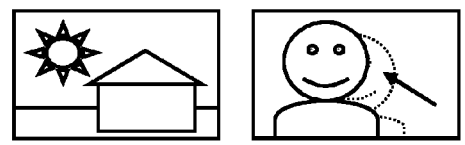
FIG. 14 shows the views of the rear and front camera units when the apparatus is twisted as shown in FIG. 13.
Figure 15:
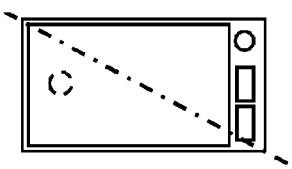
FIG. 15 shows a diagonal center axis of curvature over which the apparatus flexes when twisted as shown in FIG. 13.

FIGS. 11 to 15 illustrate various different ways of flexing an apparatus. FIG. 11 shows bending the apparatus 10 of FIG. 1 so that the first and second portions are pushed backwards with relation to the central part of the apparatus 10. FIG. 12 shows a corresponding change in the views of the two cameras 120, 130. FIG. 13 shows twisting of the apparatus 10 of FIG. 1 so that the first portion is held in place while the second portion is twisted back from upper edge. FIG. 14 shows that correspondingly, the view of the rear camera unit 130 remains unchanged while the view of the front 120 changes diagonally as the body 100 bends over a diagonal center axis of curvature illustrated in FIG. 15.

Figure 16:
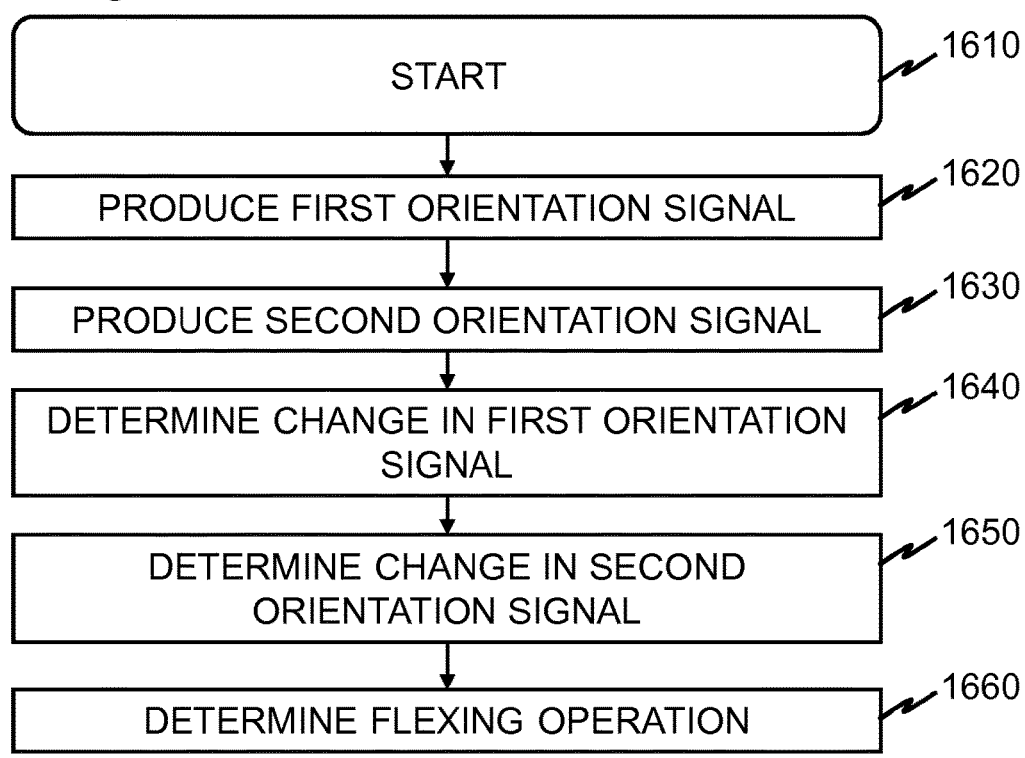
FIG. 16 shows a process according to an example embodiment, e.g. as performed by the processor 1010.

FIG. 16 shows a process according to an example embodiment, e.g. as performed by the processor 1010.

The operation is started 1610 e.g. when the apparatus 10 is switched on or when movement is detected by an acceleration sensor of the apparatus (not shown, may be incorporated with an orientation sensor). Then, a first orientation signal is produced 1620 by the first orientation sensor 1040 and a second orientation signal is produced 1630 by the second orientation sensor 1050. Change in the first orientation signal and in the second orientation signal is determined in respective steps 1640 and 1650. The flexing operation is then determined 1660. It is noticed that the use of the orientation sensors 1040 and 1050 provides the ability to detect which of the two portions have been moved when the apparatus 10 is flexed. This information is also used in some example embodiments to distinguish between different user commands. For instance, the flexing operation may be as shown in FIG. 13 in which the left-hand side of the apparatus 10 is held still while the right-hand side of the apparatus is twisted in counter-clockwise rotational direction. This flexing can be associated with one command while similar flexing of the apparatus 10 by rotating the left-hand side of the apparatus can be associated with same or different command. Also a different command can be associated to a case in which both the first and second portions are turned or bent.

Sometimes, the entire apparatus is moved without incurring any change in its flexing state. For instance, a user may slightly tilt a device backwards in which case all the orientation sensors ideally indicate identical change in their orientations. Such a change can then be neglected or at least understood as no change with regard to the determining of the flexing of the apparatus. In some example embodiments, sequences of different gestures by the user are detected. For instance, one command can be recognized when the apparatus is tilted and twisted and/or bent in a predetermined order. The same orientation sensors that can determine the flexing can also determine tilting or rotating of the device. With acceleration sensors, also linear movements can be combined with flexing of the apparatus for indicating desired commands.

In the foregoing, bending and twisting have been used as examples of flexing that can be detected according to some example embodiments. The bending has been discussed over a vertical or diagonal axis. In an example embodiment, the bending can be made over a horizontal axis. In yet another example embodiment, the bending can be made over an axis in any direction.

When optical orientation sensing is used, a moving object could cause a false indication of bending or tilting of the apparatus. In an example embodiment, the extent of change of the image object is compared with predefined maximum and if the predefined maximum is exceeded, the detected change of the image object is neglected.

Figure 17:
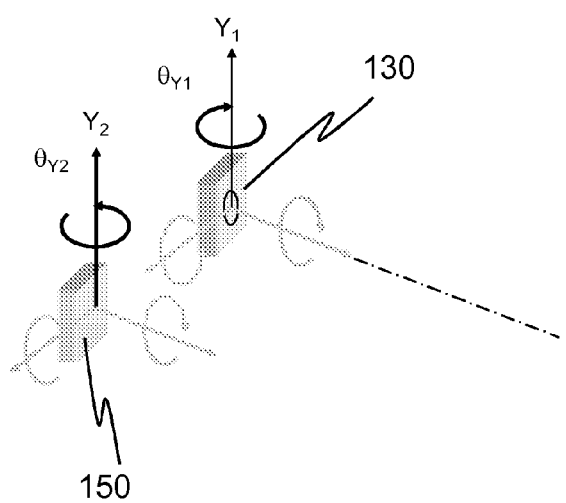
FIGS. 17 and 18 illustrate angular changes at two orientation sensors when the apparatus is bent outwards as in FIG. 11.
Figure 18:
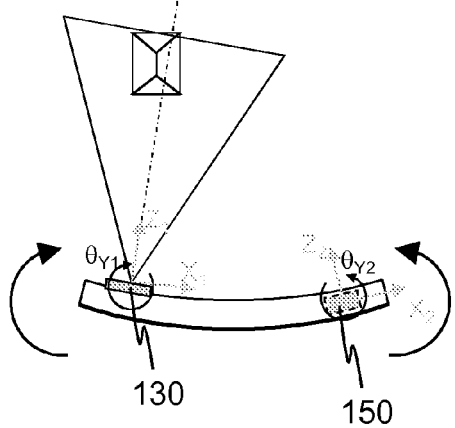

FIGS. 17 and 18 illustrate angular changes at two orientation sensors when the apparatus 10 is bent outwards as in FIG. 11.

Figure 19:
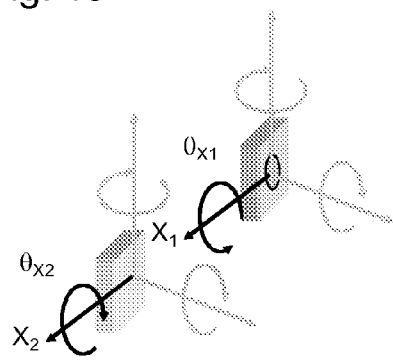
FIGS. 19 and 20 illustrate angular changes at two orientation sensors when the apparatus is twisted by turning both ends of the apparatus.
Figure 20:
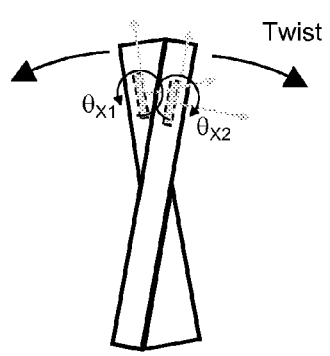

FIGS. 19 and 20 illustrate angular changes at two orientation sensors when the apparatus 10 is twisted by turning both ends of the apparatus 10.

Figure 21:
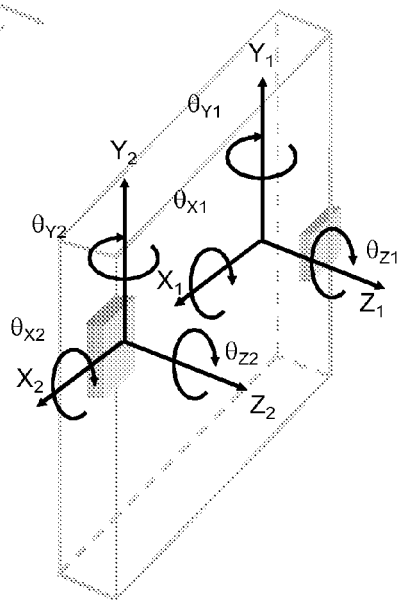
FIG. 21 illustrates an example embodiment wherein an apparatus comprises two gyroscopes or magnetometers for determining angular changes at first and second portions of the apparatus.

FIG. 21 illustrates an example embodiment in which the apparatus 10 comprises two gyroscopes or magnetometers that can determine angular changes at first and second portions of the apparatus 10. Such orientation sensors are also independent of ambient light.

In one example embodiment, the apparatus comprises an optical image stabilizing circuitry configured to stabilize a camera unit of the apparatus. The optical image stabilizing circuitry is configured to use at least one common gyroscope with an orientation sensor.

Without in any way limiting the scope, interpretation, or application of the claims appearing below, a technical effect of one or more of the example embodiments disclosed herein is that flexing of an apparatus can be detected without installation parts that have to move or stretch with relation to other parts of the apparatus. Another technical effect of one or more of the example embodiments disclosed herein is that readily existing components such as camera units and/or gyroscopes contained by an apparatus can be used for determining the flexing of the apparatus. Another technical effect of one or more of the example embodiments disclosed herein is that apart from detecting how the apparatus is flexed, it is possible to distinguish which end or portion of the apparatus is or are flexed. Another technical effect of one or more of the example embodiments disclosed herein is that designing and manufacturing of flexible devices can be simplified by removing need to attach larger flex sensing components.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined. For instance, the orientation of one portion of the apparatus can be determined by using two or more orientation sensors of same or different types (e.g. optical, gyroscope and/or magnetometer sensors).

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a body configured to be capable of being flexed during use of the apparatus at least by any of: bending; and twisting;
   the body comprising a first portion and a second portion that move with respect to each other when the body is being flexed;
   the first portion comprising a first orientation sensor configured to produce first orientation signals indicating a current orientation of the first portion;
   the second portion comprising a second orientation sensor configured to produce second orientation signals indicating a current orientation of the second portion;
   the apparatus further comprising at least one processor configured to:
   determine mutual motion of the first portion and the second portion based on the orientations of the first portion and of the second portion as indicated by the first orientation signals and the second orientation signals, wherein the first orientation sensor comprises a first camera unit.

2. The apparatus of claim 1, wherein the second orientation sensor comprises a gyroscope.

3. The apparatus of claim 1, wherein the second orientation sensor comprises a magnetometer.

4. The apparatus of claim 1, further comprising a display having a display direction to which the display is configured to display information; wherein the first camera unit is directed to an opposite direction than the display direction.

5. The apparatus of claim 4, wherein the second orientation sensor comprises a second camera unit.

6. The apparatus of claim 5, wherein the first camera unit and the second camera unit are directed to opposite directions when the body is in a non-flexed configuration.

7. The apparatus of claim 1, wherein the second orientation sensor comprises a second camera unit.

8. The apparatus of claim 7, wherein the first camera unit and the second camera unit are directed to opposite directions when the body is in an non-flexed configuration.

9. The apparatus of claim 1, wherein the processor is configured to process the orientation signals received from a camera unit by identifying one or more image objects in signals produced by the camera unit at two different moments of time and by identifying relative movement of the identified one or more image objects.

10. The apparatus of claim 1, wherein the first and second portions are located at opposite edges of the body.

11. A method, comprising:
  receiving from a first orientation sensor first orientation signals indicative of a current orientation of a first portion of a body of an apparatus, which body is capable of being flexed during use of the apparatus at least by any of: bending; and twisting; the body comprising the first portion and a second portion that move with respect to each other when the body is being flexed;
  receiving from a second orientation sensor second orientation signals indicative of a current orientation of the second portion of a body of an apparatus; and
  determining mutual motion of the first portion and the second portion based on the orientations of the first portion and of the second portion as indicated by the first orientation signals and the second orientation signals,
  wherein the first orientation sensor comprises a camera unit.

12. The method of claim 11, wherein the first and second portions are located at opposite edges of the body.

13. An apparatus, comprising:
  a processor configured to
  receive from a first orientation sensor that comprises a camera unit first orientation signals indicative of a current orientation of a first portion of a body of the apparatus, which body is capable of being flexed during use of the apparatus at least by any of: bending; and twisting; the body comprising the first portion and a second portion that move with respect to each other when the body is being flexed;
  receive from a first orientation sensor second orientation signals indicative of a current orientation of the second portion of a body of the apparatus; and
  determine mutual motion of the first portion and the second portion based on the orientations of the first portion and of the second portion as indicated by the first orientation signals and the second orientation signals.

14. An apparatus, comprising:
  at least one processor; and
  at least one memory including computer program code
  the at least one memory and the computer program code configured to, with the at least one processor, cause the apparatus to perform at least the following:
  receiving from a first orientation sensor that comprises a camera unit first orientation signals indicative of a current orientation of a first portion of a body of the apparatus, which body is capable of being flexed during use of the apparatus at least by any of: bending; and twisting; the body comprising the first portion and a second portion that move with respect to each other when the body is being flexed;
  receiving from a second orientation sensor second orientation signals indicative of a current orientation of the second portion of the body of the apparatus; and
  determining mutual motion of the first portion and the second portion based on the orientations of the first portion and of the second portion as indicated by the first orientation signals and the second orientation signals.

15. A memory medium comprising a computer program that comprises:
  code for receiving from a first orientation sensor that comprises a camera unit first orientation signals indicative of a current orientation of a first portion of a body of an apparatus, which body is capable of being flexed during use of the apparatus at least by any of: bending; and twisting; the body comprising the first portion and a second portion that move with respect to each other when the body is being flexed;
  code for receiving from a second orientation sensor second orientation signals indicative of a current orientation of the second portion of the body of the apparatus; and
  code for determining mutual motion of the first portion and the second portion based on the orientations of the first portion and of the second portion as indicated by the first orientation signals and the second orientation signals;
  when the computer program is run on a processor;
  wherein the memory medium is a non-transitory memory medium.

* * * * *